April 25, 1939. J. M. WEITSMAN 2,155,851

EDUCATIONAL AND IDENTIFICATION CHART

Filed July 18, 1935 4 Sheets-Sheet 1

INVENTOR:
James M. Weitsman
BY Elizabeth B. Brown
ATTORNEY.

April 25, 1939.   J. M. WEITSMAN   2,155,851

EDUCATIONAL AND IDENTIFICATION CHART

Filed July 18, 1935   4 Sheets-Sheet 2

INVENTOR:
James M. Weitsman,
BY Elizabeth C. Brown,
ATTORNEY.

April 25, 1939. J. M. WEITSMAN 2,155,851
EDUCATIONAL AND IDENTIFICATION CHART
Filed July 18, 1935 4 Sheets-Sheet 3
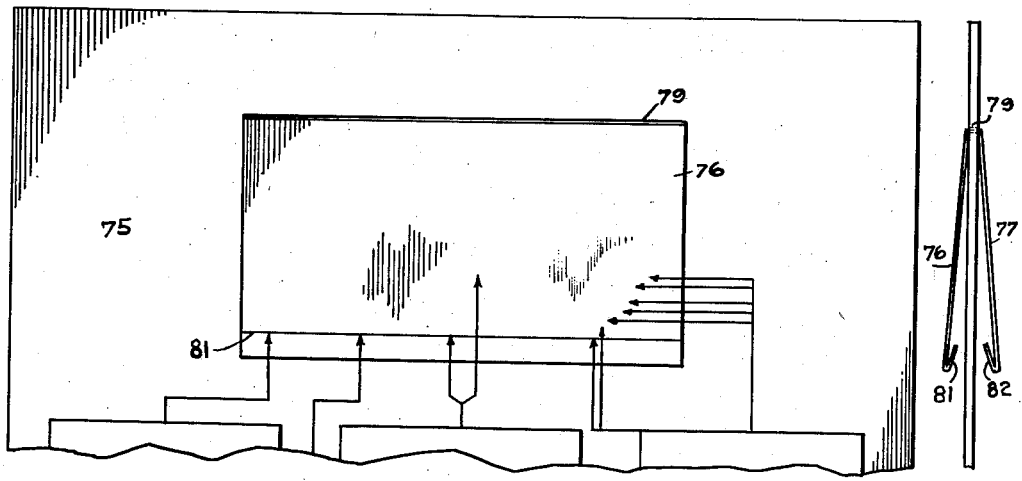
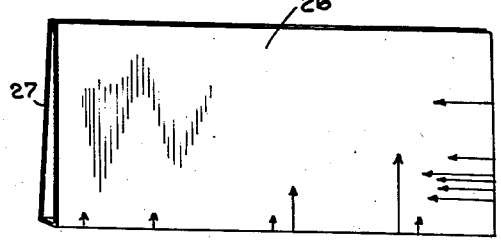
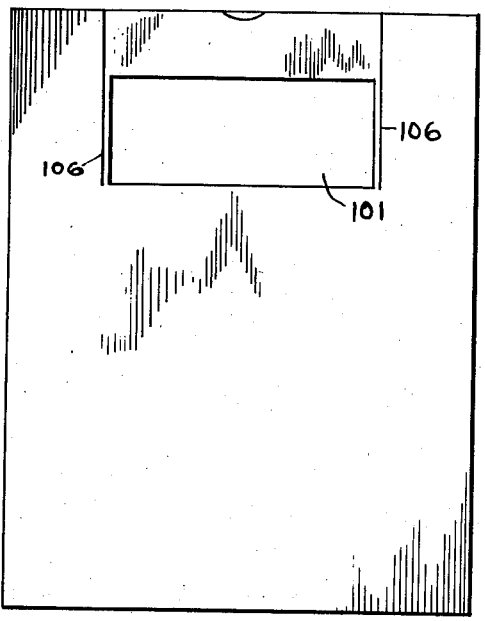
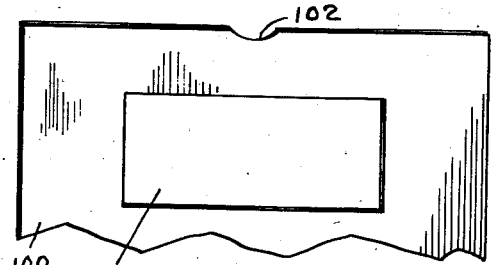
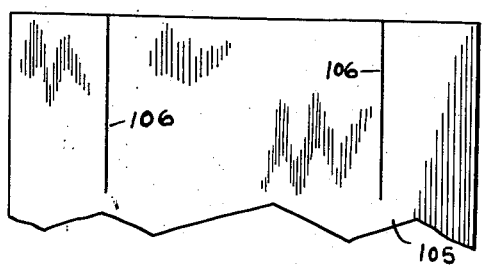
James M. Weitsman,
INVENTOR.
BY Elizabeth C. Brown,
ATTORNEY.

April 25, 1939. J. M. WEITSMAN 2,155,851

EDUCATIONAL AND IDENTIFICATION CHART

Filed July 18, 1935 4 Sheets-Sheet 4

James M. Weitsman,
INVENTOR.
BY Elizabeth C. Brown,
ATTORNEY.

Patented Apr. 25, 1939

2,155,851

UNITED STATES PATENT OFFICE 2,155,851

EDUCATIONAL AND IDENTIFICATION CHART

James M. Weitsman, Brooklyn, N. Y.

Application July 18, 1935, Serial No. 32,053

13 Claims. (Cl. 35—24)

The invention relates to charts which may be used for the purpose of setting out in a convenient form a statement of the characteristics of genuine currency of various kinds and denominations, and more particularly relates to such a chart which provides means for holding a bill or note in position for convenient comparison of the features appearing thereon with the statements on the chart, either for the purpose of learning and memorizing the characteristics of genuine currency or for the purpose of ascertaining whether or not any particular bill or note is genuine or counterfeit.

One of the principal objects of the invention is to provide such a device which shall provide means for referring the descriptive matter to an actual bill or note, in a convenient and unmistakable manner, which shall be compact and easy to handle, and simple and inexpensive to manufacture, and especially which shall be effective in leading all classes of people to become familiar with the characteristics of genuine money. Further objects and advantages of the invention will be in part set forth in the following specification and in part will be obvious therefrom without being specifically pointed out, the same being realized and attained as hereinafter more fully described or as set forth in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in this specification.

In the accompanying drawings:

Fig. 4 is a face view of the upper part of a slightly modified form of this embodiment;

Fig. 5 is an edge view of Fig. 4;

Fig. 6 is a perspective view of the transparent member forming part of the chart shown in Figs. 1, 2 and 3, hereinafter more fully described;

Fig. 8 is a face view of another embodiment of the invention;

Figs. 9 and 10 are views respectively of elements of the device shown in Fig. 8;

In carrying my invention into effect in one of the embodiments thereof which I have selected for illustration in the accompanying drawings and for description in this specification, and referring now more particularly to Figs. 1, 2, 3 and 6, I provide a card 25, printed on both sides as hereinafter more fully referred to, and which is provided with a transparent member of convenient size and form to hold a bill in place for examination. This may be made of Celluloid of about 10 gauge, or any other material suitable for the purpose, as desired. As shown, it consists of a sheet formed into a device having a horizontal base 28 which is slightly wider than the thickness of the cardboard of which the chart is made, and two upwardly extending flaps 26 and 27, each of which is of about the size of a bill or note of any denomination (see Fig. 7). By reference to Fig. 3 it will be seen that this member is assembled with the main part of the chart by passing through a slit 29 therein, and that the converging slant which is formed into the transparent member causes the two flaps 26 and 27 to lie normally in close contact with the face of the chart; when a bill or note is to be examined, however, the same is placed behind the transparent member, and the slight excess width at the bottom portion there prevents any tendency for it to be forced into an outwardly slanting position by the thickness of the bill behind it. The stiffness of the Celluloid is ordinarily sufficient to hold the bill in place, but the same may of course be steadied with the hand or finger if desired.

The printing on the face of the chart comprises various descriptive matter, primarily setting forth the characteristics of genuine currency. Each set of data is shown in an enclosing line or box, that is to say, each box contains a group of descriptions or a comparative table or the like, pointing out the specific feature which should appear at a given place upon a bill or note of any particular kind or denomination. From each box extends a leader line, which extends to a point indicating the particular feature referred to upon the actual bill or note being examined. It will therefore be understood that the leader line is printed partly upon the face of the card and partly upon the Celluloid or Cellophane window. This has the effect of carrying the eye from the exact point referred to on the bill, to the correct descriptive matter, or, vice versa, from the descriptive matter to the place on the bill or note where the feature should appear, all of which is accomplished in the simplest possible manner, as well as in a manner which avoids the illegal use of a similitude of any bill or note and which is adapted for the examination of any bill or note whatsoever, whether genuine or counterfeit, and of any kind and denomination, in the quickest manner and with an effective contrast of the features which should be found on the various bills and notes respectively.

Figures 1, 3:
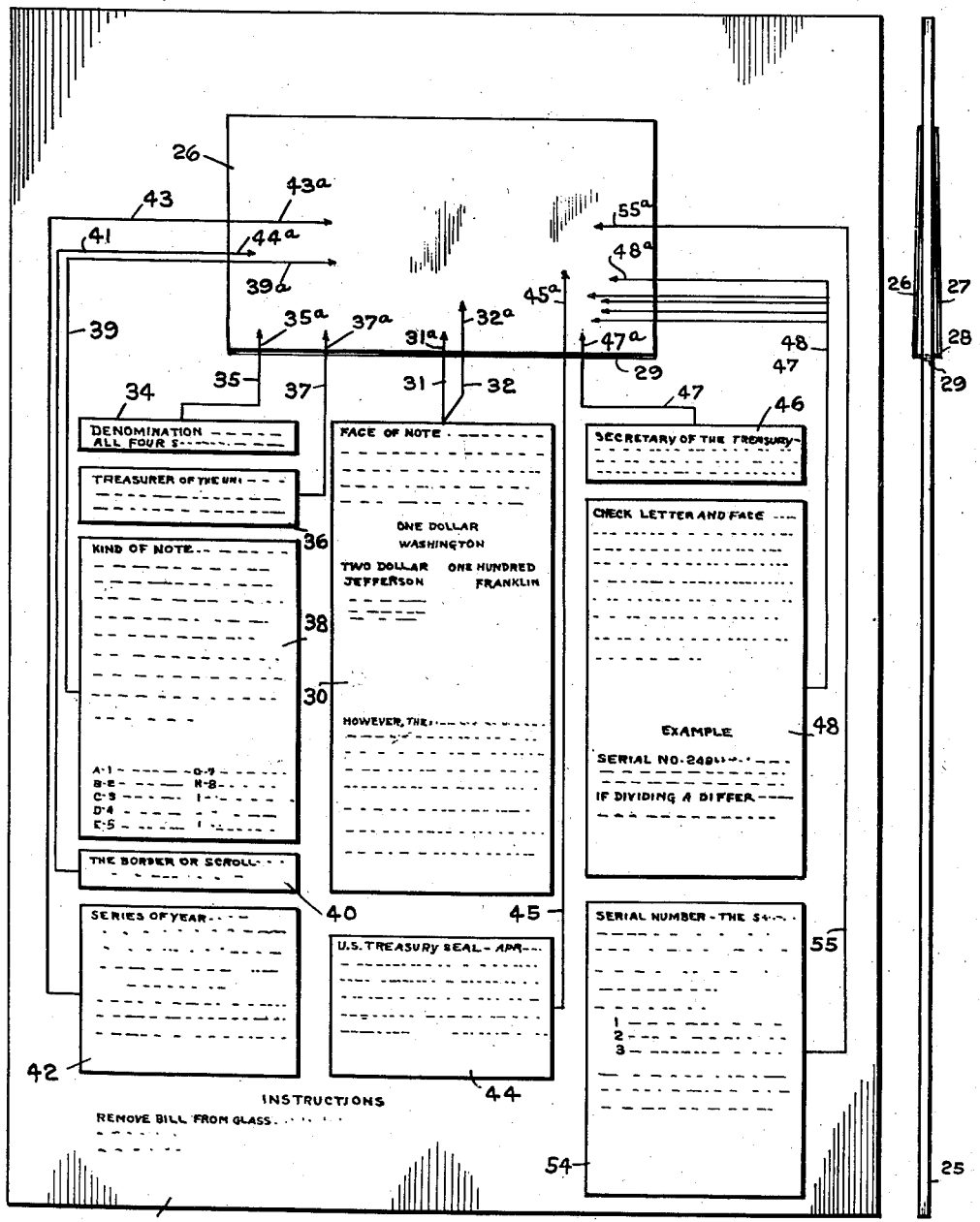
Fig. 1 is a face view of one embodiment of my invention.
Fig. 3 is an edge view thereof.

For instance, the matter in the central box shown in Fig. 1 and designated 30, will read in substance somewhat as follows:

"Face of Note—On the face of all notes you will find the following characteristics—the entire note is printed in black on white paper, each note having a different portrait with the name thereof printed underneath:

One dollar
Washington

| Two dollars Jefferson | One hundred dollars Franklin |
| Five dollars Lincoln | Five hundred dollars McKinley |
| Ten dollars Hamilton | One thousand dollars Cleveland |
| Twenty dollars Jackson | Five thousand dollars Madison |
| Fifty dollars Grant | Ten thousand dollars Chase |

However, the Treasury seal and serial numbers are printed in green, blue, red or brown. The seal is round, surrounded by points resembling a gear, the inside bearing an inverted V with a scale above and a key below and is located either on the right or left side of the face of the note and corresponds in color with the serial numbers which appear in duplicate on the lower left and upper right portion of the note, generally consisting of eight numerals preceded and followed by a letter."

From this box 30, extend leader lines 31 and 32, to the edge of the Celluloid, which register with continuations 31a and 32a which terminate in arrows which indicate respectively the location of the title and portrait on the face of the note under the transparent member, the continuation lines 31a and 32a being printed on the face of the transparent flap 26.

At the left of the chart, the box 34 reads:
"Denomination of Note—located in all four corners."

This box is connected by the composite leader line 35—35a with a point on the transparent member under which the denomination of the note should appear in the lower left-hand corner. The box 36 reads:

"Treasurer of the United States—used in describing notes. If brown seal is used as the model, look below upper border."

This box is connected with the proper point on the window by the composite line 37—37a.

The next box, 38, is headed "Kind of Note" and gives full data for distinguishing between kinds of bills and notes, together with a list of the letters designating the various Federal Reserve districts. This box is connected with the proper point on the window by the composite line 39—39a, running up at the left and then turning at right angles to extend over the window.

The box 40, which is connected with the window by line 41—41a, reads:
"The border or scroll work—used in describing defects in counterfeit notes."

The box 42, connected by line 43—43a, refers to "Series of Year".

On the right-hand side, the box 46, connected by line 47—47a, refers to "Secretary of the Treasury" used in describing notes, etc. Below this the box 48 contains a full explanation as to check letter and face plate number, the importance of the check letter, and the fact that if certain check letters appear respectively, the result of a division of the number must be as set forth therein. The box 54 contains a full explanation as to the serial number and the necessary result of certain divisions of the number as a test of genuineness.

At the foot of the chart appear "Instructions", pointing out the various points to notice and preferably memorize in order to become adept at recognizing genuine and counterfeit currency.

Figures 2, 7:
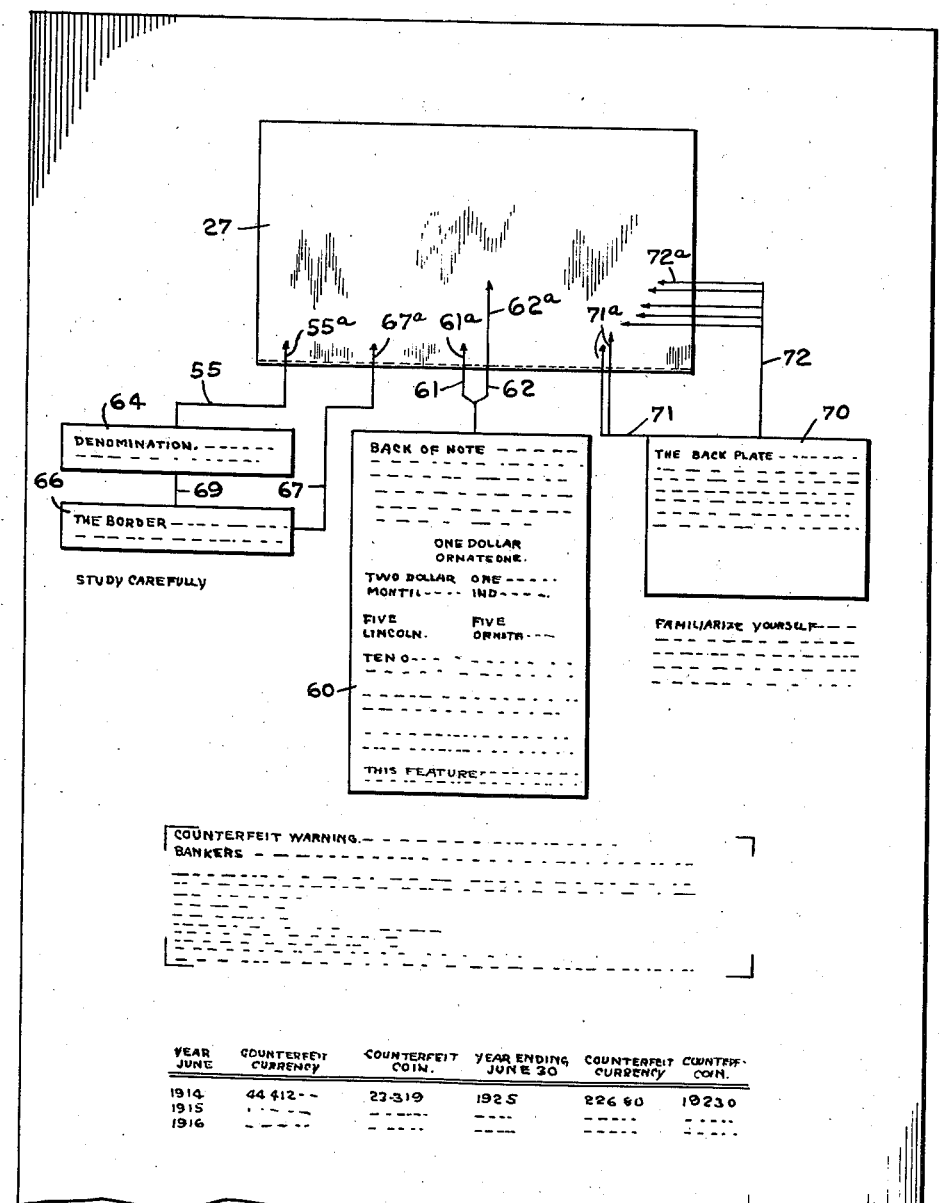
Fig. 2 is a view of the reverse side of the same embodiment, slightly broken away at the bottom to save space.
Fig. 7 is a similar view of the transparent member shown in Figs. 4 and 5.

On the back of the chart, as illustrated in Fig. 2, appears a central box 60, enumerating the designs or pictures on the back of notes of various denominations. At the left appear boxes 64 and 66, referring to the denomination and to the border and scroll work, and connected with the window by lines as shown. At the right appears a box 70 giving an explanation as to the back plate number.

Under the box 66 appears other explanatory matter, suggesting certain points which should be carefully studied, and at the right appears matter relating to becoming familiar with the paper used in printing currency.

At the foot of the chart appears various warning matter as to counterfeit money in circulation, which of course might be varied in different editions of the chart more than would be probable in the case of the matter above referred to.

It will be understood that the arrangement and wording of the matter set forth, is not an essential part of my invention, as it could be extensively varied in many ways.

The modification shown in Fig. 4 is similar to that just described, except that the Celluloid member which is used is of the form shown in perspective in Fig. 7. This is mounted in a slit 79 at the top of the chart, and has downwardly extending flaps 76 and 77, also upturned lower edges 81 and 82. A note to be examined is placed behind one of the flaps, and is supported on the upturned edge. The transparent flap is then held flat against the body of the chart, so that the lines printed on it will register with those on the cardboard.

It will be understood that the printed part is similar to that already described, and therefore it is not thought necessary to set the same forth in any detail here.

Another embodiment of the invention is shown in Figs. 8, 9 and 10. The chart is shown in Fig. 8, and comprises a card 100, the upper part of which is shown separate in Fig. 9. This card has an opening 101, of convenient size to receive a bill or note and permit the same to be viewed from either side. The back of the card is covered with a continuous piece of Cellophane or the like, or any suitable material (not shown in the drawings). The front of the card is covered with similar material, of similar shape but having a straight top edge and provided with cuts 106. The portion of the front sheet 105 which lies between these cuts 106 is not fastened to the card 100, but forms a flap which normally lies flat against the card but may be lifted forward to slip a bill behind the same. The bill will then lie between the front and back sheets of Cellophane and may be viewed from either side without removing it from back to front or vice versa.

The front and back of this form of the chart are printed with matter similar to that already described, but in this modification of the invention the leader lines are continuous, extending from the part of the Cellophane which is pasted to the card, on over the part which forms the transparent window over the opening 101, thus providing a very neat, compact and pleasing form of the device.

It is not thought necessary to describe the details of this modification more specifically, as the same will be plain from the drawings and from what has been said.

Figure 11:
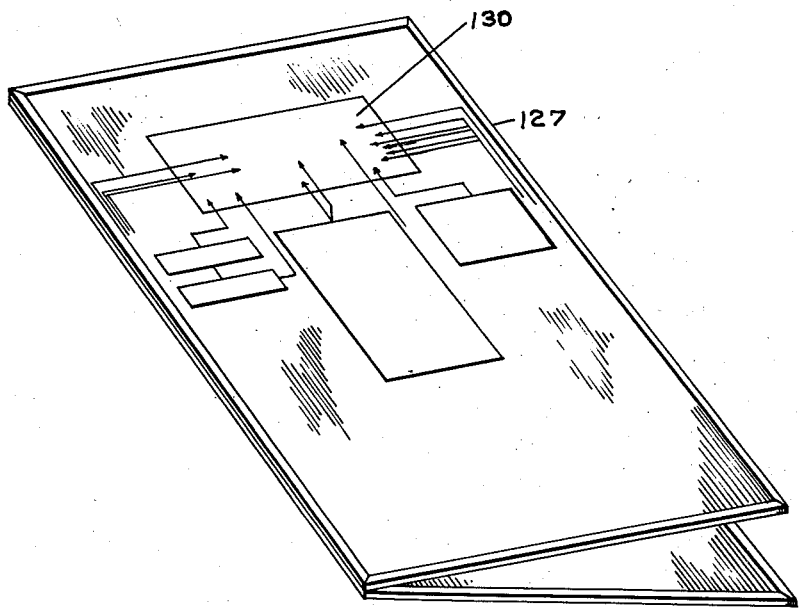
Fig. 11 is a perspective view of a third embodiment of the invention.
Figure 12:
Fig. 12 is an edge view of Fig. 11.

Another embodiment is shown in Figs. 11 and 12. In this form the chart is printed upon two leaves of glass, which close together like a book or folder. The printing would naturally be upon the inside of the glass, a suitable background also being provided over the part of the glass upon which the printing appears. The window 130 is of course left clear, and the spaces between the boxes of printed matter may be clear or not as desired, the latter being an esthetic rather than an inventive point.

In Fig. 12, an edge view is shown with a bill 129 in place. The leaves in this case close upon the bill and hold it in place.

It will be understood that the printing will be substantially as contemplated in the modification last above described, that is, with continuous leader lines from the boxes extending out over the window.

This modification might of course have the printing upon the outside or in the form of paper pasted on if desired, or might even consist of a single sheet of glass with the printing upon the two sides and the note to be examined being merely held in place by the hand, on either side as desired, and viewed from the other side.

It is believed that both the operation and the advantages of my invention will be obvious from what has been above said, and that it is not necessary to describe the same in detail here. It will be understood that the bill or note to be examined is placed behind the transparent member and viewed through the same, and that consequently the leader lines appearing on the face of the window lead the eye at once to the specific point on the note to which the descriptive matter at any particular part of the chart relates, thus accomplishing the desired result in any one of a number of ways, but all without the illegal use of any similitude of a bill or note of currency, or the illegal mutilation of any such currency.

I do not limit myself to the particular details of construction and use which are set forth in the foregoing specification and illustrated in the accompanying drawings, as the same refer to and set forth only certain embodiments of the invention and it is obvious that the same may be modified, within the scope of the appended claims, without departing from the spirit and scope of the invention.

Having thus described my invention, what I claim as new and desire to secure by Letters Patent, is as follows:

1. A chart comprising in combination a transparent window behind which a bill or note of currency may be located in a predetermined position and there examined, descriptive matter upon a portion of said chart which will not be superimposed upon a bill or note located in such predetermined position referring to the characteristics of various kinds and denominations of currency, and leader lines partly upon said transparent window indicating the location at which characteristics referred to should appear if present when said bill or note is in such predetermined position.

2. A chart comprising a relatively opaque main portion and a transparent member adapted to hold a bill or note in place for convenient examination, comprising a sheet of transparent material mounted in a slot in said main portion, so as to lie normally flat against said main member, whereby a bill or note may be placed and held between the same, said main portion being provided with descriptive matter referring to various kinds and denominations of currency, located upon parts of said chart not occupied by such bill or note when in position for examination, and leader lines partly upon said transparent member and leading to specific points of interest on a bill or note placed behind the same.

3. A chart comprising a member having an opening of a size to receive a bill or note of currency, a transparent member covering said opening on each side and adapted to have a bill or note placed therebetween for examination therethrough from either side, descriptive matter referring to the characteristics of various kinds and denominations of currency, and lines partly upon said transparent members respectively over said opening and leading to specific points of interest on a bill or note placed therebetween.

4. A chart comprising a pair of transparent members, a portion of each of which bears descriptive matter referring to the characteristics of various kinds and denominations of currency, and a portion of each of which is left unobstructed except for leader lines indicating the specific points of interest on a bill or note placed therebetween.

5. A chart comprising in combination a transparent portion through which a bill or note of currency may be examined in a predetermined location relatively thereto, descriptive matter upon a relatively opaque portion of said chart referring to characteristics of a note or bill which are visible through said transparent portion when such note or bill is placed in said predetermined location for examination, leader lines connecting various items of said descriptive matter with the location at which the specific characteristics referred to should appear through said transparent portion if present, and a mark for indicating said predetermined location.

6. A chart comprising in combination a transparent portion through which a bill or note of currency may be examined, a relatively non-transparent portion, descriptive matter thereon referring to characteristics of a note or bill of currency which are visible through said transparent portion when such note or bill is placed in position for examination, and leader lines partly upon said transparent window and partly upon said relatively non-transparent portion of said chart and indicating the location at which the respective characteristics referred to in various parts of said descriptive matter should appear through said transparent portion if present.

7. An educational and identification chart comprising in combination a relatively non-transparent portion, descriptive matter thereon referring to standard characteristics of various kinds and denominations of currency, a transparent portion through which a bill or note of currency may be examined and through which characteristics so described will then appear if present so that they may be compared with the description thereof, and leader lines partly upon said transparent portion and partly upon said relatively non-transparent portion of said chart and connecting the respective items of descriptive matter with the specific locations on said window at which such characteristics respectively should be seen if present.

8. A chart comprising in combination a transparent portion of such size as to hold a bill or note of currency exactly in a predetermined position and through which same may be examined, descriptive matter upon a relatively opaque portion of said chart other than said position for said bill or note referring to characteristics of a note or bill which are visible through said transparent portion when such note or bill is placed in such position for examination, and indicating marks upon said transparent portion indicating the specific items of such descriptive matter with which the characteristics appearing at such points respectively should be compared to ascertain the agreement or disagreement thereof with such description.

9. A chart comprising in combination a transparent portion of such size as to hold a bill or note of currency exactly in a predetermined position and through which same may be examined, descriptive matter upon a relatively opaque portion of said chart referring to characteristics of a note or bill which are visible through said transparent portion when such bill or note is placed in such position for examination, and leader lines connecting various items of said descriptive matter with the locations at which the specific characteristics referred to should respectively appear if present.

10. An educational and identification chart comprising in combination a relatively opaque portion, descriptive matter thereon referring to visible characteristics of an article having standard characteristics, a transparent portion through which an article purporting to have such characteristics may be examined and through which characteristics so described will then appear if present and may be conveniently compared with the descriptions thereof respectively, and leader lines partly upon said transparent window and partly upon the relatively non-transparent portion of said chart and connecting the respective items of descriptive matter with the specific locations on said window at which such characteristics respectively should be seen if present.

11. A chart having a transparent member adapted to hold a bill or note of currency in place for convenient examination, comprising a relatively opaque main portion and a sheet of transparent material mounted in a slot in said main portion and having a portion lying approximately parallel therewith upon each face thereof whereby a bill or note of currency may be held in place upon either face of said chart and viewed through said transparent member, said chart being provided with descriptive matter referring to the characteristics of various kinds and denominations of currency, and leader lines partly upon said transparent member and leading to the location at which specific points of interest on a bill or note of currency placed behind the same should appear.

12. An educational and identification chart comprising in combination a relatively opaque main portion bearing items of descriptive matter referring to standard characteristics of a bill or note of currency, and a transparent portion in juxtaposition therewith and adapted to locate a bill or note of currency in predetermined position for ready comparison of the various characteristics thereof with said items of descriptive matter respectively, whereby when said bill or note is in place a unitary illustrative device will be produced without mutilation or representation of such currency.

13. A device as set forth in claim 12, in which said items of descriptive matter relate to standard characteristics of various kinds and denominations of currency.

JAMES M. WEITSMAN.